United States Patent Office 3,414,609
Patented Dec. 3, 1968

3,414,609
DICARBOXYLIC ACID ESTERS OF 2,2,4-TRIALKYL-3-HYDROXYPENTYL ALKANOATES
Hugh J. Hagemeyer, Jr., and Alfred G. Robinson, Longview, Tex., assignors to Eastman Kodak Company, Rochester, N.Y., a corporation of New Jersey
No Drawing. Continuation-in-part of application Ser. No. 161,358, Dec. 22, 1961. This application Mar. 7, 1966, Ser. No. 532,053
7 Claims. (Cl. 260—475)

This application is a continuation-in-part of our copending application Ser. No. 161,358, filed Dec. 22, 1961, now abandoned of the same title.

This invention relates to certain novel esters and to a novel catalytic method for preparing carboxylic acid esters of diol partial esters having a free secondary hydroxyl group.

The invention is based on our discovery that diesters and polyesters having unexpected valuable properties in a number of important uses can be prepared from certain 2,2,4-trialkyl-3-hydroxypentyl alkanoates of the type:

(I) 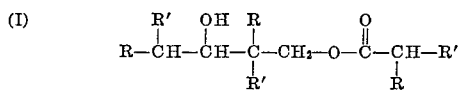

wherein the substituents R and R' are the same or different lower alkyl radicals such as methyl, ethyl, isopropyl, propyl, butyl, isobutyl, etc.

The literature discloses that partial esters of type (I) can be obtained with other reaction products by the Tischenko condensation of an aldehyde having a single α-hydrogen atom in the presence of an alkoxide catalyst: Tischenko et al., Chem. Zentr., 1906, II, 1552–1556; Kulpinski and Nord, J. Org. Chem., 8, 256 (1943); and Villani and Nord, J. Am. Chem. Soc., 69, 2605 (1947). The reaction can be represented by the equation:

An improved method of preparing the diol half esters (I) is disclosed in the copending U.S. patent application of H. J. Hagemeyer, Jr., and H. N. Wright, Jr., Ser. No. 122,104, filed July 6, 1961, now U.S. Patent No. 3,091,-632. In this method an aldehyde of the type,

is contacted with an alkali metal alkoxide catalyst under dry, acid-free conditions at a temperature of 65 to 105° C., at a low catalyst concentration, preferably less than 2 weight percent, and for a short residence time, preferably less than three hours. This procedure can be used to obtain high yields of the desired glycol monoester (I) starting with aldehydes such as isobutyraldehyde, 2-methylbutanal, 2 - ethylbutanal, 2 - methylpentanal, 2 - ethylpentanal, 2 - ethylhexanal, etc. In accordance with the present invention such glycol monoesters are converted to valuable glycol diesters or polyesters. Thus, a method is provided for producing esters useful as plasticizers, lubricants, functional fluids, etc., which has an inexpensive branched chain aldehyde as its starting material and thus the method provides important advantages of economy over the conventional use of relatively expensive glycols for preparing esters that are useful as plasticizers and lubricants.

It should be understood that although the glycol monoester product used as a reactant in accordance with the invention is principally the type (I) monoester having a secondary hydroxyl group in the 3-position, the isomer having the acyloxy group in the 3-position and a primary hydroxyl group in the 1-position may also be present to a minor extent.

The 2,2,4 - trialkyl - 3 - hydroxypentyl alkanoates can be esterified with carboxylic acids in the presence of conventional acidic esterification catalysts such as hydrochloric acid, sulfuric acid, stannous chloride and the like and certain novel esters in accordance with the invention can be so obtained. However, we have found that when this type of glycol monoester having a free secondary hydroxyl group is subjected to direct esterification or to ester interchange a number of undesirable side reactions such as dehydration, cyclization and carbonium ion rearrangement can take place in preference to the desired formation of diesters or polyesters. The use of conventional esterification catalysts such as mineral acids, aryl sulfonic acids, titanium alkoxides and zinc, tin and aluminum halides aggravates the tendency of these glycol monoesters to undergo the undesired side reactions.

We have now discovered that superior results in yield and quality of the desired esterification product can be obtained by carrying out the esterification of the glycol monoesters of type (I) in the presence of certain selected catalysts. These catalysts are substantially neutral or basic compounds of divalent or tetravalent tin, including tin oxides, tin hydroxides, and certain organo-tin compounds of which the non-metallic atoms are limited to carbon, hydrogen and oxygen. The organo-tin compounds include tin alkoxides and derivatives of tin containing one or more hydrocarbon radicals, i.e., alkyl, alicyclic or aryl, attached to the tin atom through a direct carbon-tin linkage. Examples of suitable organo-tin compounds include di- and tetra-alkyl and aryl tin compounds such as dibutyl tin, dihexyl tin, diphenyl tin, dibenzyl tin, tetrabutyl tin, tetraethyl tin, tetramethyl tin, dibutyl diphenyl tin, and tetraphenyl tin; di- and tetraalkoxides such as tin dibutoxide and tin tetrabutoxide; mixed alkyltin alkoxides such as dibutyl tin dibutoxide; and alkyl tin salts having alkyl and acyloxy radicals attached to the tin atom, such as dibutyl tin diacetate and dibutyl tin di - 2 - ethylhexanoate. Also suitable are tin compounds in which two of the tetraalkyl radicals are replaced with oxygen to form compounds such as dimethyl tin oxide, dibutyl tin oxide, diheptyl tin oxide, and dioctyl tin oxide.

The suitable tin catalysts thus include compounds of the types $R_2Sn$, $R_4Sn$, $Sn(OH)_2$, $Sn(OH)_4$, $SnO$, $SnO_2$, $Sn(OR)_2$, $Sn(OR)_4$, $R_2SnO$, $R_2Sn(OR)_2$ and $$R_2Sn(OAc)_2$$

wherein R is a straight or branched chain alkyl radical of 1 to 8 carbon atoms or an aryl radical of 6 to 9 carbon atoms (e.g., phenyl, tolyl, benzyl, etc.) and Ac is an acyl radical of 2 to 18 carbon atoms (e.g., acetyl, butyryl, stearoyl, benzoyl, etc.).

We have discovered that by the use of such substantially neutral or basic tin catalysts we can produce esters of the glycol monoesters of type (I) and monocarboxylic or dicarboxylic acids with little or no dehydration, cyclization or carbonium ion rearrangement. By reducing or substantially eliminating the undesired side reactions we produce the desired esters and polyesters in markedly improved yields, for example, in yields as high as about 90 percent or even higher. Furthermore, by the method of our invention we can obtain esters that have little or no color or odor, products that are thus quite valuable in certain plasticizer uses.

The acids used as reactants in our process can in general be any aliphatic, alicyclic or aromatic monocarboxylic or dicarboxylic acid, including acids having halogen, oxygen, sulfur or nitrogen containing substituents that do not interfere with the esterification reaction. The preferred acids are aliphatic and aromatic acids having from 2 to 20 carbon atoms per molecule.

Examples of suitable monocarboxylic acids include straight or branched chain, saturated or unsaturated aliphatic acids and aromatic acids such as acetic acid, propionic acid, butyric acid, isobutyric acid, 2-methylbutyric acid, 3-methylbutyric acid, hexanoic acid, 2,2-dimethylbutyric acid, 2-ethylhexanoic acid, 2,2-dimethylhexanoic acid, pelargonic acid, 2,2,4-trimethylpentanoic acid, 2,2,4-trimethylpentanoic acid, 2,2-dimethyloctanoic acid, lauric acid, stearic acid, acrylic acid, methacrylic acid, vinylacetic acid, crotonic acid, oleic acid, benzoic acid, linoleic acid and o-toluic acid. Mixtures of monocarboxylic acids can also be used to esterify the glycol monoester. A particularly useful mixture is a mixture of fatty acids derived from tall oil. Such mixtures are available commercially as fatty acid fractions of tall oil which consist essentially (e.g., 98 to 99 weight percent) of fatty acids of from 16 to 20 carbon atoms, of which about 70 to 95 percent are unsaturated acids such as oleic and linoleic.

The dicarboxylic acids used in the method of the invention are in general acids of the type, HOOC—R—COOH, wherein R is a divalent organic radical such as a straight or branched chain alkylene or alkenylene radical of from 1 to 8 carbon atoms; a divalent alicyclic radical; a phenylene radical or substituted phenylene radical preferably of 6 to 9 carbon atoms of which the bonds to the carboxyl groups are in the ortho, meta or para position; oxygen or a radical such as —R′—O—R′— or —R′—S—R′—, wherein R′ is a lower alkylene radical of, for example, 1 to 4 carbon atoms. R can also be simply a bond connecting the carboxyl groups, in which case the acid is oxalic acid.

Examples of such dicarboxylic acids include acids of the oxalic acid series, $C_nH_{2n}(COOH)_2$, wherein $n$ is an integer from 0 to 8 such as oxalic acid, malonic acid, succinic acid, glutaric acid, adipic acid, trimethyladipic acid, 2,2-dimethylglutaric acid, azelaic acid, sebacic acid, etc.; acids of the fumaric acid series, $C_nH_{2n-2}(COOH)_2$, wherein $n$ is an integer from 2 to 8, such as maleic acid, fumaric acid, itaconic acid, etc.; alicyclic dicarboxylic acids such as 1,4-cyclohexanedicarboxylic acid; aromatic acids, such as phthalic acid, terephthalic acid, isophthalic acid, etc.; acids in which the divalent radical connecting carboxyl groups containing oxygen or sulfur, such as diglycolic acid, thiodipropionic acid, and the like. When available the corresponding acid anhydrides of the mono- or di-

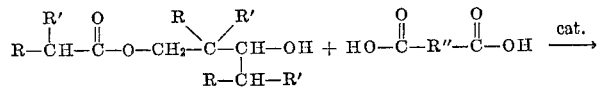

carboxylic acids can also be used, such as acetic anhydride, isobutyric anhydride, maleic anhydride, phthalic anhydride, succinic anhydride, glutaric anhydride, etc. When our specification and claims refer to the use of an acid in preparing esters in accordance with the invention we use the term "acid" in its generic sense to mean either the acid or the corresponding acid anhydride.

In carrying out the method of the invention the monocarboxylic or dicarboxylic acid, and the glycol monoester (I) are mixed and heated in a reaction vessel with the catalysts for a reaction period preferably of at least about 4 hours or up to about 24 hours. The mole ratio of glycol monoester to acid can be about 1:1 when using a monocarboxylic acid and about 2:1 when using a dicarboxylic acid. The use of an excess of the glycol monoester increases the reaction rate. Therefore, preferably the glycol monoester is used in a slight excess of the molar equivalent to the acid. The preferred mole ratios are about 5:4 and 5:2 for the monocarboxylic acid and the dicarboxylic acid, respectively. The tin catalyst of the type described is employed in a concentration preferably of about 0.001 to 1 percent. Higher concentrations can be used but with no particular advantage. The reaction is carried out at temperatures ranging in general from 50 to 250° C. and at atmospheric pressure, although higher or lower pressure can be used. Inert diluents such as diethyl ether, diisopropyl ether, ethylene dichloride, benzene, toluene or xylene or other suitable azeotoroping agents can be used to remove the water as formed and to maintain the desired reaction temperature. For suitable reaction rates and for products of the least amount of color we generally prefer to operate in the temperature range of 120 to 210° C.

When substantially all of the acid is reacted, the crude ester is stripped with an inert gas such as steam or methane to remove traces of lower boiling materials, washed with dilute alkali to remove residual acidity, dried and filtered to obtain the final product.

In continuous operation of the process it is sometimes desirable to subject the gross reaction product to an alkali wash and then to wash with water. The azeotroping agent is stripped out with lower boiling materials for recycle to the process. The product is then dried and filtered.

The reaction that takes place when employing a monocarboxylic acid in the method of the invention can be represented by the following equation:

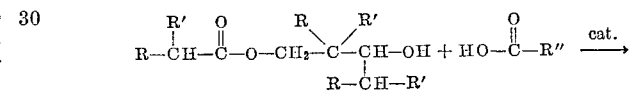

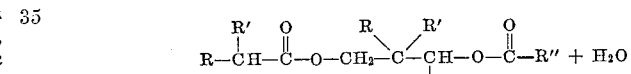

wherein R and R′ are lower alkyl radicals and R″ is the residue of an aliphatic or aromatic carboxylic acid having from 2 to 20 carbon atoms.

When a dicarboxylic acid is used in accordance with the invention, ester interchange occurs in addition to direct esterification and the product is at least in part a polyester. The reaction can be represented as follows:

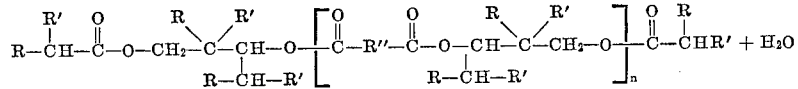

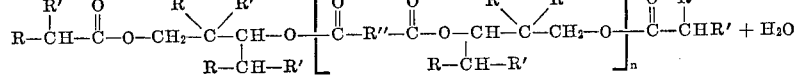

wherein R and R′ are the same as above, R″ represents a divalent straight or branched chain, saturated or unsaturated hydrocarbon radical, e.g., an alkylene or alkenylene radical, of 1 to 10 carbon atoms, a phenylene or substituted phenylene radical, a divalent alicyclic radical, a radical of the type —R—O—R— or —R—S—R—, oxygen, or the covalent carbon-carbon bond between the two carboxyl groups of oxalic acid. The value of $n$ is one or greater, e.g., 1 to 10. Preferably, the average molecular weight of the polymeric reaction mixture (ebullioscopic method) is in the range of about 500 to about 1500 and therefore the value of $n$ is preferably no greater than about 5.

Normally the reaction product obtained with dicarboxylic acids comprises a mixture of esters in which $n$ is from 1 to about 5, the principal component being the compound in which $n$ equals one. For example, in the reaction of 3-hydroxy-2,2,4-trimethylpentyl isobutyrate with adipic acid, the equilibrium composition under the preferred reaction conditions consists of approximately 60 weight percent of the compound in which $n$ equals one and 40 weight percent of polyesters in which $n$ is greater than one. It is possible to separate by distillation the material with the value of $n$ equal to one (which, for brevity, we can refer to as the "monomer") from the higher polymeric compounds. The products prepared in accordance with the invention can comprise from about 25 to 50 weight percent of the polymeric material, the rest being essentially the monomer. For some purposes either the monomer, the mixture as produced in the reaction or the higher polyester ($n=2$ to 5) separated from the monomer will be preferred. We have found that the mixtures as produced have exceptional properties as plasticizers and lubricants. As a plasticizer the mixture shows better permanence than the monomer by itself, although the plasticizer activity of the mixture is not quite so good as that of the monomer when equal weights are compared. When used in a lubricating composition the products of the invention, particularly the products containing the higher polymeric material, are advantageously blended with other lubricant components such as a diester synthetic lubricant of lower molecular weight and lower viscosity than the polymeric material of the invention. Certain of the compositions prepared by the method of the invention are also useful as antioxidant additives for polyolefins or as reagents for copolymerization with vinyl monomers to form polymeric surface coating materials.

Further understanding of the invention can be obtained from the following working examples which illustrate procedures in accordance with the invention and other procedures. Certain of the examples also illustrate the preparation of novel compositions of the invention.

Example 1 describes the preparation of a novel polyester composition in accordance with the invention by the reaction of adipic acid with 3-hydroxy-2,2,4-trimethylpentyl isobutyrate (the latter also being called 2,2,4-trimethyl-1,3-pentanediol monoisobutyrate and abbreviated as TMPD–MI). The polyester composition of this example is a valuable new material, being useful, for example, as a synthetic lubricant, as a plasticizer for vinyl resins, cellulose esters and other polymeric plastics and for other purposes.

In the examples and tables hereinafter the abbreviation APHA stands for American Public Health Association. The measurements of APHA color, on a Pt–Co scale, is described on page 673 of the book "Technical Methods of Analysis" by Roger C. Griffin, published in 1927 by McGraw-Hill. The abbreviation ASTM stands for American Society for Testing Materials.

Example 1

A mixture consisting of 292 g. (2 mols) of adipic acid, 1080 g. (5 mols) of 2,2,4-trimethyl-1,3-pentanediol monoisobutyrate, 150 g. xylene and 1.6 g. of dibutyl tin oxide was heated to reflux under a water separator. The water as formed was removed azeotropically. The base temperature ranged from 188 to 197° C. Essentially all of the adipic acid had reacted in seven hours. The mixture was stripped free of low boilers with low pressure steam superheated to 180° C. and the product washed with 5 percent caustic solution. The organic layer was then dried and filtered to give 1039 g. (96 percent yield) of polyester having the following physical properties:

Color, APHA, p.p.m. _____ 80
Specific gravity, 20°/20° C. _____ 1.0047
Acid number _____ 1.5
Molecular weight _____ 625
Boiling range, ° C., 9 microns Hg _____ 125–142
Refractive index, $n_D{}^{25}$ ° C. _____ 1.4532
Hydrolytic stability, percent saponified at reflux in 0.5 N NaOH:
    After 7 hrs. _____ 5
    After 16 hrs. _____ 8
Flash point, open cup, ° F. _____ 453
Freezing point, ° F. _____ −29
Viscosity, kinematic, cs.:
    25° C. _____ 119
    100° C. _____ 8

The product of the above example obtained by esterification of TMPD–MI with adipic acid consisted predominantly of material of the general formula:

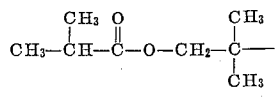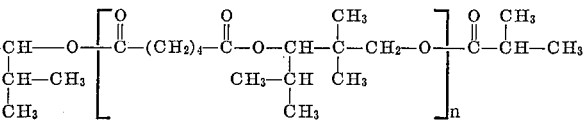

wherein $n$ is an integer from 1 to 5. This product is useful as a synthetic lubricant. It can be used for instance as a major or minor component of a synthetic lubricant blend with a conventional diester lubricant. The product is particularly valuable as a plasticizer. It has very low color and is essentially odorless. It is compatible with polymeric plastics such as cellulose acetate butyrate, ethyl cellulose, cellulose nitrate, phenolic resins and poly(vinyl chloride) in resin to plasticizer ratios of 1:1 to 1:4 and with poly(vinyl acetate) and polystyrene in ratios of 1:3 and 1:4. It is useful as a permanent-type primary plasticizer for vinyl formulations, especially plastisols. Its excellent hydrolytic stability makes it valuable as a plasticizer for products used under humid conditions. Although of rather high molecular weight, it is easily handled because of low viscosity and low freezing point. The processing of vinyls is aided by its "striking in" ability. It exhibits good mechanical properties and permanence in calendered vinyl film and sheeting and extruded formulations. The excellent electrical properties, particularly high dielectric strength and volume resistivity, imparted to vinyls by this plasticizer is useful in plastics requiring electrical insulating characteristics.

Certain of the valuable properties of the TMPD–MI adipic acid polyester of Example 1 are shown in Table I which compares the permanence and extraction properties of the polyester of the invention with those of the conventional plasticizer di-2-ethylhexyl phthalate (abbreviated "DOP") in milled poly(vinyl chloride) formulations.

TABLE I

| Physical Properties | Plasticizer | |
|---|---|---|
| | Polyester of TMPD–MI [1] and Adipic Acid | DOP |
| Extraction, percent loss: | | |
|   Heptane | 19.0 | 23.5 |
|   Activated Carbon | 0.5 | 1.3 |
| Volatility, percent loss, 1 day at 70° C. | 0.6 | 1.2 |
| Elongation Retention, percent | 54 | 43 |

[1] TMPD–MI=2,2,4-trimethyl-1,3-pentanediol monoisobutyrate.

The product of Example 1 is also useful as a plasticizer for polypropylene. When milled into polypropylene the resulting resin shows a higher flow rate and a lower brittleness temperature while the stiffness is substantially unaffected. These physical properties of polypropylene plasticized with 5 weight percent of the polyester of Example 1 and of unmodified polypropylene are given in Table II.

TABLE II

| Physical Property | Plasticized Polypropylene | Unmodified Polypropylene |
|---|---|---|
| Flow Rate at 230° | 13 | 5 |
| Brittleness Temperature (° C.) | −16 | +20 |
| Stiffness in Flexure, p.s.i. | 114,700 | 119,900 |

The superiority of our method over the use of other catalysts for esterifying the 2,2,4-trialkyl-3-hydroxypentyl alkanoates is demonstrated by the next two examples in which a mineral acid and titanium alkoxide were used as the catalyst and the yield and/or color of the product were poor.

Example 2

When the above reaction of Example 1 was repeated, using 2 g. of sulfuric acid as the catalyst, only 226 g. (21 percent yield) of product was obtained (APHA color greater than 500). High amounts of by-products, 2,2,4,4-tetramethyltetrahydrofuran (13 percent yeild); 2,5-dimethyl-2,4-hexadiene (8 percent yield); and 2,2,4-trimethyl-3-pentenyl isobutyrate (53 percent yield) were formed.

Example 3

When the reaction described in Example 1 was repeated except that 2 g. of titanium tetraisopropoxide was used as the catalyst, 945 g. (87 percent yield) of product was obtained having an APHA color of 500.

The next two examples demonstrate the method of the invention using other dicarboxylic acids of the oxalic acid series, $C_nH_{2n}(COOH)_2$, or the anhydride thereof and the preparation of novel compositions of the invention having utility as synthetic lubricants and as plasticizers for polymeric plastics such as vinyl resins and cellulose esters.

Example 4

The procedure of Example 1 was repeated but using 296 g. of phthalic anhydride (2 mols) instead of adipic acid. A yield of 1080 g. of novel polyester product (95 percent yield) was obtained. The product consisted predominantly of material of the general formula:

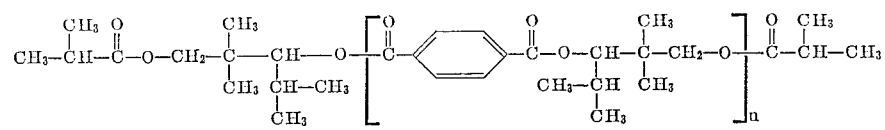

wherein $n$ is an integer from 1 to 5. Typical physical properties of the product of this example are as follows:

Color, APHA, p.p.m. _____ 60
Specific gravity, 20°/20° C. _____ 1.0519
Acid number _____ 1.7
Molecular weight _____ 640
Boiling range, ° C., 15 microns Hg _____ 135–200
Refractive index, $n_D^{25°}$ C. _____ 1.4877

Example 5

The procedure of Example 1 was repeated but using 376 g. of azelaic acid (2 mols) instead of adipic acid. A yield of 1132 g. of novel polyester product (97 percent yield) was obtained which consisted predominantly of material of the general formula:

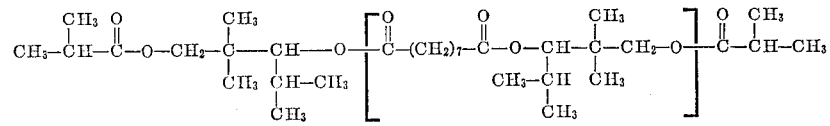

wherein $n$ is an integer from 1 to 5. The product had the following physical properties:

Color, APHA, p.p.m. _____ 75
Specific gravity, 20°/20° C. _____ 1.0028
Acid number _____ 1.1
Molecular weight _____ 695
Boiling range, ° C., 60 microns Hg _____ 170–180
Refractive index, $n_D^{25°}$ C. _____ 1.4544

The next example demonstrates the method of the invention with another glycol monoester having a free secondary hydroxyl group and the preparation of a novel composition of the invention useful as a lubricant and as a plasticizer.

Example 6

The procedure of Example 1 is repeated but using 1290 g. of 2,4-dimethyl-2-ethyl-1,3-hexanediol mono-2-methylbutyrate (5 mols) instead of TMPD-MI. A typical yield of 1180 g. of novel polyester product (94 percent yield) is obtained, which consists predominantly of material of the following general formula:

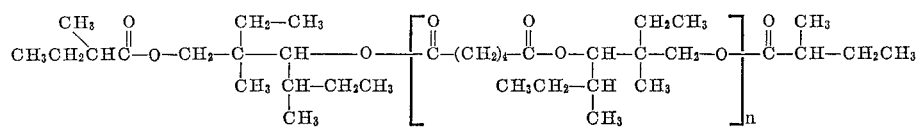

wherein $n$ is an integer from 1 to 5. The product has the following typical physical properties:

Color, APHA, p.p.m. _____ 80
Acid number _____ 1.0
Molecular weight _____ 670
Boiling range, ° C., 10 microns Hg _____ 130–155

The next example illustrates the esterification of TMPD-MI with a thiodicarboxylic acid in accordance with the invention.

Example 7

The procedure of Example 1 was repeated except that 356 g. (2 mols) of thiodipropionic acid was used instead of adipic acid. A yield of 1110 g. (97 percent yield) of polyester was obtained having an APHA color of 60 and an average molecular weight of 650. This product was useful as an antioxidant for polypropylene.

The next two examples illustrate the use of other tin catalysts in accordance with the invention.

Example 8

The procedure of Example 1 was repeated except that 1.6 g. of dibutyl tin diacetate was used as the catalyst instead of dibutyl tin oxide. A yield of 1030 g. (95 percent yield) of polyester substantially the same as the product of Example 1 was obtained, the product having an APHA color of 100.

Example 9

The procedure of Example 1 was repeated except that 1.6 g. of stannous hydroxide was used as the catalyst instead of dibutyl tin oxide. A yield of 994 g. (92 percent yield) of polyester substantially the same as the product of Example 1 was obtained, the product having an APHA color of 80.

The next example demonstrates the esterification of TMPD–MI with the anhydride of an unsaturated dicarboxylic acid of the fumaric acid series, $$C_nH_{2n-2}(COOH)_2$$

and the recovery of a novel unsaturated polyester.

Example 10

The procedure of Example 1 was repeated except that 196 g. (2 mols) of maleic anhydride was used instead of adipic acid. An unsaturated polyester product was obtained in the amount of 916 g. (95 percent yield), the product consisting predominantly of material of the general formula:

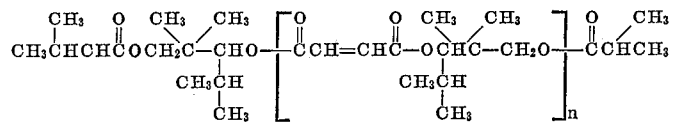

wherein $n$ is an integer from 1 to 5. Physical properties of the above product were as follows:

Color, APHA, p.p.m. _____ [1] 500
Specific gravity, 20°/20° C. _____ 1.022
Acid number _____ 2.5
Molecular weight _____ 630
Boiling range, ° C., 10 microns Hg _____ 100–120
Refractive index, $n_D^{25}$ ° C. _____ 1.4592

[1] The poor color of the product was due to the fact that commercially available maleic anhydride was used in the reaction without prior purification. A product of much better color can be obtained by using purified maleic anhydride.

The novel unsaturated polyester product of Example 10 prepared by the esterification of TMPD–MI with maleic acid, in addition to its utility as a lubricant and as a plasticizer, is also useful in the preparation of useful plastics by copolymerization with a vinyl monomer. For example, the unsaturated polyester is mixed with styrene in a parts by weight ratio of about 3:2 and in the presence of a small amount of an organic peroxide catalyst, e.g., 0.0025 part of benzoyl peroxide. When the mixture is cast on glass plates and cured at elevated temperature, e.g., 80° C. for 4 hours, a hard transparent film is obtained which is useful as a surface coating.

The next example illustrates use of the method of the invention in esterifying TMPD–MI with a monocarboxylic acid ester, namely benzoic acid. The resulting TMPD–MI benzoate is a valuable plasticizer for vinyl floor tiles. It has excellent compatibility with the usual inorganic fillers for vinyl tile compositions and the tiles have excellent resistance to staining by common household chemicals.

Example 11

A mixture consisting of 488 g. (4 mols) of benzoic acid, 1080 g. (5 mols) of 3-hydroxy-2,2,4-trimethylpentyl isobutyrate, 150 g. of xylene and 1.0 g. of dibutyl tin oxide was heated to reflux under a water separator. The water as formed was removed azeotropically. The base temperature of the esterification reactor ranged from 185–196° C. Essentially all the benzoic acid had reacted in 30 hours. The mixture was stripped free of low boilers with low pressure steam superheated to 180° C. and the product washed with 5 percent caustic solution. The organic layer was then dried and filtered to give 1200 g. (94 percent yield) of benzoate ester of 2,2,4-trimethyl-1,3-pentanediol monoisobutyrate, having an APHA color of 50. The superior physical properties of this product over those of di-2-ethylhexyl phthalate (abbreviated as DOP) when milled into polyvinyl chloride resin, are illustrated by the following comparative data:

| Physical Properties | Plasticizer | |
| --- | --- | --- |
| | Benzoate of TMPD–MI | DOP |
| Tensile Strength (p.s.i.) | 3,200 | 3,100 |
| Tear resistance (p.p.i.) | 460 | 370 |
| Durometer hardness | 83 | 85 |
| Heptane extraction (percent loss) | 14 | 24 |

Example 12

When the procedure of Example 11 was repeated, using 2 g. of sulfuric acid, only 428 g. (33.5 percent yield) of benzoate ester was obtained (APHA color greater than 500). High amounts of by-products 2,2,4,4-tetramethyltetrahydrofuran (19 percent yield); 2,5- dimethyl-2,4-hexadiene (4 percent yield); and 2,2,4-trimethyl-3-pentenyl isobutyrate (39 percent yield) were formed.

A number of additional esters have been prepared in accordance with the invention from different monocarboxylic acids and two different glycol monoesters, namely, 2,2,4-trimethyl-1,3-pentanediol monoisobutyrate and 2,4-dimethyl-2-ethyl-1,3-hexanediol mono-2-methylbutyrate. The procedure was as follows.

Examples 13–41

The esters were prepared by refluxing a mixture consisting of 4 mols of the monocarboxylic acid, 5 mols of the glycol monoester, an azeotroping agent and the tin catalyst. The concentration of catalyst was 0.2 percent based on the weight of monocarboxylic acid used. The reaction mixture was stripped free of low boilers with steam and the product washed with 5 percent caustic solution. The organic layer was then dried and filtered to obtain the desired ester. Tables III and IV below list the particular reactants, reaction conditions and product yields for each preparation. The acid identified as tall oil acid was a commercial fatty acid fraction of tall oil comprising at least about 97 weight percent $C_{16}$–$C_{20}$ fatty acids, at least about 70 percent being unsaturated acids, about 60 percent being oleic acid.

TABLE III.—ESTERS OF 2,2,4-TRIMETHYL-1,3-PENTANEDIOL MONOISOBUTYRATE AND MONOCARBOXYLIC ACIDS

| Example No. | Monocarboxylic Acid | Catalyst | Azeotroping Agent | Reaction Temp. (° C.) | Reaction Time (hrs.) | Yield (percent) |
| --- | --- | --- | --- | --- | --- | --- |
| 13 | Acetic | Dibutyl tin oxide | Benzene | 140–160 | 10 | 94 |
| 14 | Propionic | do | do | 140–160 | 8 | 93 |
| 15 | Butyric | Stannous hydroxide | do | 140–160 | 10 | 95 |
| 16 | Isobutyric | Dibutyl tin oxide | do | 140–160 | 16 | 92 |
| 17 | 2-methylbutyric | do | do | 150–165 | 18 | 94 |
| 18 | 3-methylbutyric | Stannous hydroxide | do | 150–165 | 16 | 93 |
| 19 | Hexanoic | Dibutyl tin oxide | do | 160–180 | 9 | 98 |
| 20 | 2,2-dimethylbutyric | Dibutyl tin diacetate | do | 160–175 | 18 | 91 |
| 21 | 2-ethylhexanoic | Dibutyl tin oxide | Xylene | 160–175 | 16 | 94 |
| 22 | 2,2-dimethylhexanoic | do | do | 160–180 | 16 | 91 |
| 23 | 2,2,4-trimethylpentanoic | Dibutyl tin dibutoxide | do | 165–190 | 24 | 94 |
| 24 | 2,3,4-trimethylpentanoic | Dibutyl tin oxide | do | 170–190 | 24 | 92 |
| 25 | 2,2-dimethyloctanoic | do | do | 180–200 | 22 | 92 |
| 26 | Tall oil acid | do | do | 180–200 | 18 | 96 |

TABLE IV.—ESTERS OF 2,4-DIMETHYL-2-ETHYL-1,3-HEXANEDIOL MONO-2-METHYLBUTYRATE AND MONOCARBOXYLIC ACIDS

| Example No. | Monocarboxylic Acid | Catalyst | Azeotroping Agent | Reaction Temp. (° C.) | Reaction Time (hrs.) | Yield (percent) |
| --- | --- | --- | --- | --- | --- | --- |
| 27 | Acetic | Stannous hydroxide | Benzene | 155–165 | 8 | 94 |
| 28 | Propionic | Dibutyl tin diacetate | do | 150–165 | 8 | 93 |
| 29 | Butyric | Dibutyl tin oxide | do | 160–175 | 12 | 92 |
| 30 | Isobutyric | do | do | 155–175 | 16 | 93 |
| 31 | 2-methylbutyric | do | do | 165–175 | 18 | 94 |
| 32 | 3-methylbutyric | Dibutyl tin dibutoxide | do | 165–180 | 16 | 91 |
| 33 | Hexanoic | Dibutyl tin oxide | do | 170–190 | 10 | 96 |
| 34 | 2-ethylhexanoic | Stannous hydroxide | Xylene | 180–200 | 18 | 94 |
| 35 | 2,2-dimethylbutyric | Dibutyl tin di-2-ethylhexanoate | Benzene | 170–185 | 20 | 94 |
| 36 | 2,2-dimethylhexanoic | Dibutyl tin oxide | Xylene | 180–200 | 18 | 95 |
| 37 | 2,2,4-trimethylpentanoic | do | do | 180–200 | 24 | 93 |
| 38 | 2,3,4-trimethylpentanoic | do | do | 180–200 | 22 | 95 |
| 39 | 2,2-dimethyloctanoic | Stannous hydroxide | do | 180–200 | 24 | 91 |
| 40 | Benzoic | Dibutyl tin diacetate | do | 180–200 | 30 | 93 |
| 41 | Tall oil acid | Dibutyl tin oxide | do | 180–200 | 18 | 95 |

The next example describes the preparation of a novel polyester of the invention which has unexpectedly valuable properties as a plasticizer.

Example 42

The procedure of Example 1 was repeated but using 268 g. of diglycolic acid (2 mols) instead of adipic acid. A yield of 986 g. of polyester product (93 percent yield) was obtained which consisted essentially of material of the general formula:

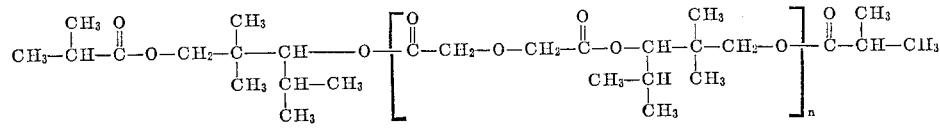

wherein $n$ is an integer from 1 to 5. Typical properties of the novel TMPD–MI diglycolate as prepared in this example are as follows:

Color, Gardner scale _____ 3
Specific gravity, 20°/20° C. _____ 1.025
Pounds per gallon, 20° C. _____ 8.5
Acid number _____ 1.1
Boiling range, ° C., 15 microns Hg _____ 140–150
Freezing point, ° F. _____ −15
Flash point, Cleveland open cup, ° F. _____ 383
Molecular weight _____ 610

The novel TMPD–MI diglycolate polyester as prepared in Example 42 is useful as a lubricant and as a plasticizer. It is compatible as a plasticizer with a wide range of polymeric plastics including vinyl resins, cellulosics, phenolic, alkyd and acrylic resins and nitrile rubber. It is particularly useful as a plasticizer for acrylic lacquers in which use it shows excellent retention properties and improvement in the elongation tests of the lacquer film.

From the foregoing specification it will be seen that we have developed a novel process for producing useful mixed diesters and polyesters of glycol monoesters having a free secondary hydroxyl group, our process being based on the discovery that certain selected tin compounds catalyze the desired esterification reaction without producing large amounts of various undesired by-products that are obtained with other esterification catalysts. The specification further shows that we have produced certain novel polyesters of 3-hydroxy-2,2,4-trimethylpentyl isobutyrate and dicarboxylic acids, which polyesters are useful as lubricants and as plasticizers and in such uses possess one or more of a number of unexpected properties of considerable value such as hydrolytic and thermal stability, excellent retention properties, plasticizer compatibility with a wide range of resins, and the ability to blend with synthetic resins to form plastic compositions of markedly improved flexibility, elongation, resistance to staining and the like.

Although the use of certain organo-tin compounds as esterification catalysts has been disclosed in British Patent 810,381, there has apparently been no prior disclosure or use of the neutral to basic tin compounds as catalysts for esterifying the glycol monoesters described herein and no prior recognition of the unexpected advantages that are gained from this novel combination. Thus, whereas British Patent 810,381 apparently treats all organo tin compounds as equivalents, including certain halogenated tin compounds, and deals with the esterification of non-esterified hydroxyl compounds, we have found that the neutral to basic tin catalysts are uniquely adapted for esterification of glycol monoesters of the type of 2,2,4-trimethylpentane-1,3-diol monoisobutyrate and its homologs. The latter type of glycol monoester being characterized by the so-called "neo" or 2,2-dimethyl structure, is highly susceptible to molecular rearrangement. It appears that the neutral to basic tin catalysts are uniquely adapted to esterify such glycol monoesters with the minimum of molecular rearrangement, dehydration and other reactions yielding highly colored or otherwise undesired reaction products. Furthermore, it appears that the glycol monoester is unexpectedly superior to the corresponding glycol in its resistance to rearrangement, thus indicating that the use of the particular type of glycol monoester with the neutral or basic tin catalysts is a combination that contributes to stability against undesired molecular rearrangement of the "neo" compound.

The invention has been described in considerable detail with particular reference to certain preferred embodiments thereof, but it will be understood that variations and modifications can be effected within the spirit and scope of the invention as described hereinabove, and as defined in the appended claims.

We claim:
1. The product having the formula:

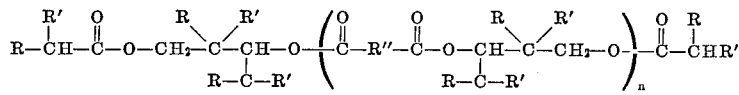

wherein R and R' are lower alkyl radicals and R" is selected from the group consisting of: alkylene, alkenylene and cycloalkylene radicals of 1–8 carbon atoms; arylene radicals of the benzene series containing 6–9 carbon atoms; the radicals —R'''—S—R'''— and

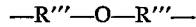

wherein R''' is a lower alkylene radical; and the carbon-carbon bond of oxalic acid; and wherein n is an integer from 1 to 5.

2. The product of claim 1 wherein R and R' are methyl and R" is —(CH$_2$)$_4$—, said product having been prepared by esterifying 2,2,4 - trimethyl - 1,3 - pentanediol monoisobutyrate with adipic acid.

3. The product of claim 1 wherein R and R' are methyl and R" is a phenylene radical, said product having been prepared by esterifying 2,2,4-trimethyl-1,3-pentanediol monoisobutyrate with a phthalic acid.

4. The product of claim 1 wherein R and R' are methyl and R" is —(CH$_2$)$_4$—, said product having been prepared by esterifying 2,2,4 - trimethyl - 1,3 - pentanediol monoisobutyrate with azelaic acid.

5. The product of claim 1 wherein R is methyl, R' is ethyl and R" is —(CH$_2$)$_4$—, said product having been prepared by esterifying 2,4-dimethyl-2-ethyl-1,3-hexanediol mono-2-methylbutyrate with adipic acid.

6. The product of claim 1 wherein R and R' are methyl and R" is —CH=CH—, said product having been prepared by esterifying 2,2,4 - trimethyl - 1,3 - pentanediol monoisobutyrate with maleic acid.

7. The product of claim 1 wherein R and R' are methyl and R" is —CH$_2$—O—CH$_2$—, said product having been prepared by esterifying 2,2,4 - trimethyl - 1,3 - pentanediol monoisobutyrate with diglycolic acid.

References Cited

UNITED STATES PATENTS

| | | | |
|---|---|---|---|
| 3,160,599 | 12/1964 | Scullin | 260—476 |
| 3,211,561 | 10/1965 | Gearhart et al. | 260—486 |
| 2,720,507 | 10/1955 | Caldwell | 260—475 |

FOREIGN PATENTS 810,381  3/1959  Great Britain.

LORRAINE A. WEINBERGER, *Primary Examiner.*

T. L. GALLOWAY, *Assistant Examiner.*

UNITED STATES PATENT OFFICE
CERTIFICATE OF CORRECTION

Patent No. 3,414,609                                                      December 3, 1968

Hugh J. Hagemeyer, Jr., et al.

It is certified that error appears in the above identified patent and that said Letters Patent are hereby corrected as shown below:

Column 7, the formula at the bottom of the page should appear as shown below:

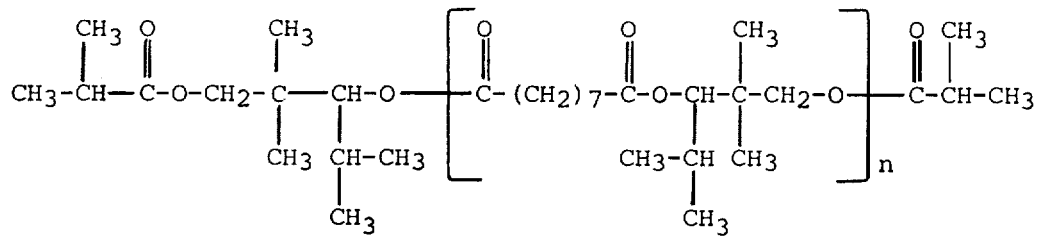

Column 9, Example 10, lines 28 to 38, the formula should appear as shown below:

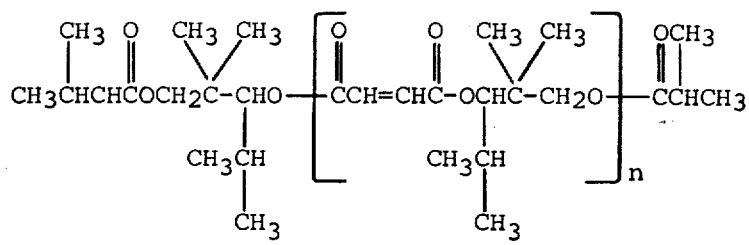

Column 14, line 4, "-$(CH_2)_4$-" should read -- -$(CH_2)_7$- --.

Signed and sealed this 10th day of March 1970.

(SEAL)
Attest:

EDWARD M. FLETCHER, JR.                                       WILLIAM E. SCHUYLER, JR
Attesting Officer                                                      Commissioner of Patents